US011871423B2

United States Patent
Li et al.

(10) Patent No.: US 11,871,423 B2
(45) Date of Patent: Jan. 9, 2024

(54) TRANSMISSION ON A PCELL SCHEDULED BY AN SCELL PDCCH IN A 5G NR NETWORK

(71) Applicant: Intel Corporation, Santa Clara, CA (US)

(72) Inventors: Yingyang Li, Beijing (CN); Gang Xiong, Beaverton, OR (US); Dae Won Lee, Portland, OR (US); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 17/171,729

(22) Filed: Feb. 9, 2021

(65) Prior Publication Data

US 2021/0168774 A1 Jun. 3, 2021

Related U.S. Application Data

(63) Continuation-in-part of application No. PCT/CN2020/121445, filed on Oct. 16, 2020, and a continuation of application No. PCT/CN2020/075115, filed on Feb. 13, 2020.

(51) Int. Cl.
*H04W 72/23* (2023.01)
*H04W 16/14* (2009.01)

(52) U.S. Cl.
CPC .......... *H04W 72/23* (2023.01); *H04W 16/14* (2013.01)

(58) Field of Classification Search
CPC ...... H04L 5/001; H04L 5/0053; H04W 16/14; H04W 72/23
See application file for complete search history.

(56) References Cited

U.S. PATENT DOCUMENTS

| 2021/0029726 | A1* | 1/2021 | Papasakellariou .. H04W 72/535 |
| 2021/0250153 | A1* | 8/2021 | Lin ........................ H04L 5/0053 |
| 2022/0408465 | A1* | 12/2022 | Ji ........................... H04W 72/20 |

* cited by examiner

*Primary Examiner* — Khoa Huynh
(74) *Attorney, Agent, or Firm* — Schwegman Lundberg & Woessner, P.A.

(57) ABSTRACT

A user equipment (UE) configured for operating in a fifth-generation (5G) new radio (NR) network may monitor search space sets for a number of physical downlink control channel (PDCCH) candidates within a number of non-overlapped control-channel elements (CCEs) for a primary cell (PCell). The number of PDCCH candidates and the number of non-overlapped CCEs may include PDCCH candidates and non-overlapped CCEs on a scheduling secondary cell (SCell). The scheduling SCell may be an SCell that schedules a transmission on the PCell. The UE may decode one or more of the PDCCH candidates on the scheduling SCell for a downlink control information (DCI) format which may schedule a physical downlink shared channel (PDSCH) transmission and/or a physical uplink shared channel (PUSCH) transmission of the PCell.

20 Claims, 4 Drawing Sheets

TRANSMISSION ON A PCELL SCHEDULED BY AN SCELL PDCCH IN A 5G NR NETWORK

PRIORITY CLAIM

This application is a continuation of International Application No. PCT/CN2020/075115, filed Feb. 13, 2020 (reference No. AC7920-PCT-Z) and International Application No. PCT/CN2020/121445, filed Oct. 16, 2020 (reference No. AD3061-PCT-Z), which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments pertain to SCell scheduling PDSCH and/or PUSCH transmissions of PCell in a 5G NR network.

BACKGROUND

The 5G NR system is introduced in 3GPP as the evolution of 4G/LTE to provide wider bandwidth and to support larger amount of traffic, extreme high reliability, and low latency, etc. Though it is expected 5G network will finally replace 4G network, there is a period of coexistence between 5G and 4G system. A 5G carrier may be a neighbor of a 4G carrier. A 5G carrier may also partially or fully overlap in frequency domain with a 4G carrier. Therefore, efficient support of coexistence between 5G and 4G system, i.e. dynamic spectrum sharing (DSS) is critical during the period of 5G system deployment.

DSS was considered since NR Rel-15. For example, a CRS pattern can be configured for NR UE, so that the PDSCH transmission of a NR carrier could be rate matched around the REs potentially used by LTE CRS, which mitigates the impact to LTE channel estimation for better LTE DL performance. For example, NR transmission should be avoided on the resource used by LTE PDCCH. The consideration of LTE CRS/PDCCH causes limitation on the NR PDCCH transmissions. Therefore, it was proposed to support that a PDCCH of SCell could schedule PDSCH and/or PUSCH transmissions of PCell, and a PDCCH could schedule PDSCH transmission on two cells. Therefore, efficient PDCCH design is a critical issue to be considered for DSS enhancement.

DETAILED DESCRIPTION

Figure 1A:
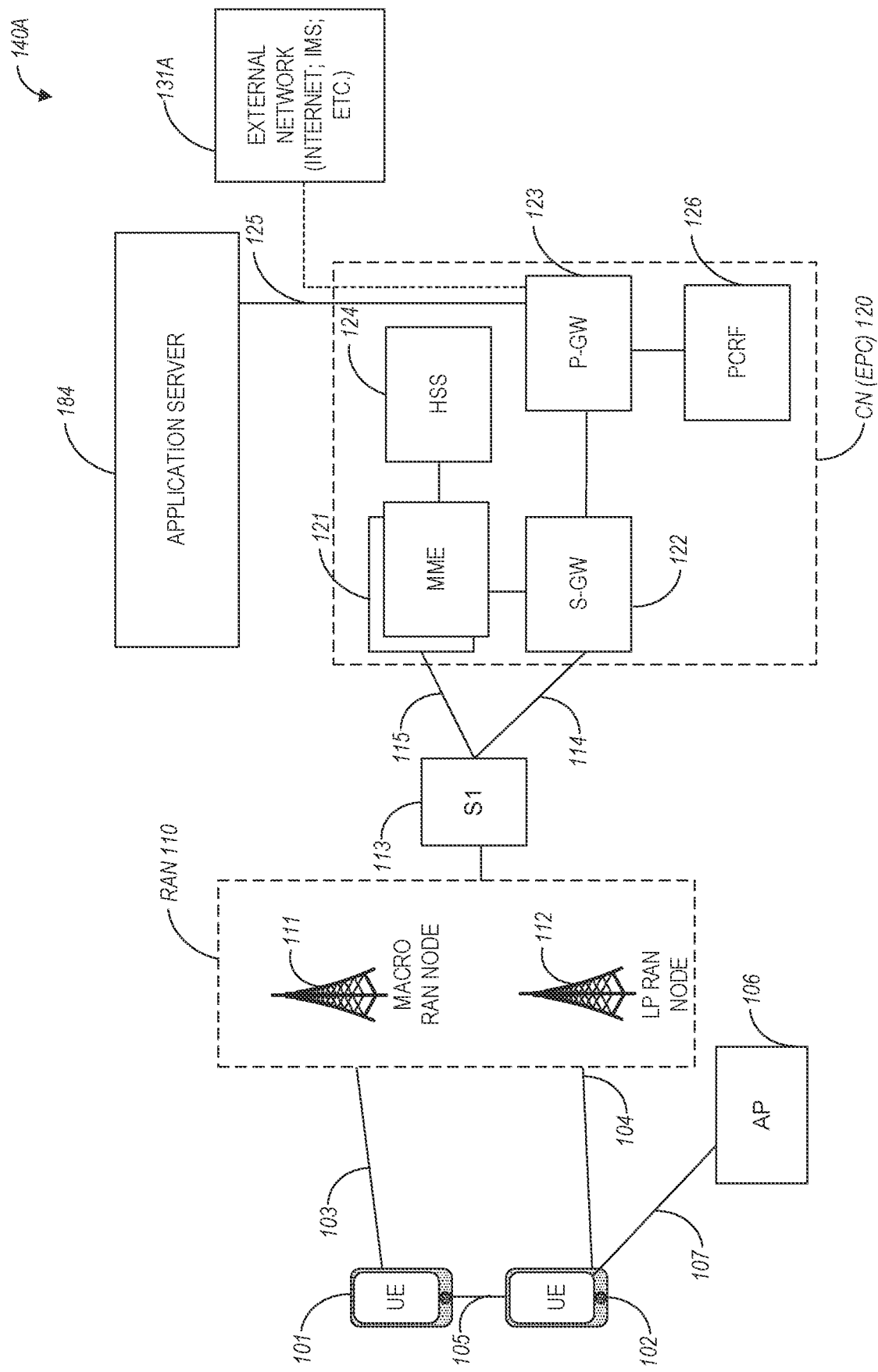
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operating in a fifth-generation (5G) new radio (NR) network. In these embodiments, the UE may be configured to monitor search space sets for a number of physical downlink control channel (PDCCH) candidates within a number of non-overlapped control-channel elements (CCEs) for a primary cell (PCell). In these embodiments, the number of PDCCH candidates and the number of non-overlapped CCEs may include PDCCH candidates and non-overlapped CCEs on a scheduling secondary cell (SCell). In these embodiments, the scheduling SCell may be an SCell that schedules a transmission on the PCell. In these embodiments, the UE may decode one or more of the PDCCH candidates on the scheduling SCell for a downlink control information (DCI) format. In these embodiments, the DCI format may schedule a physical downlink shared channel (PDSCH) transmission and/or a physical uplink shared channel (PUSCH) transmission of the PCell. In these embodiments, a PDCCH candidate/CCE may occupy time/frequency resource of the scheduling SCell. In these embodiments, a transmission on the PCell may be scheduled by the scheduling SCell.

In some embodiments, when the numbers of the PDCCH candidates or the non-overlapped CCEs to monitor the search space sets on both the PCell and the scheduling SCell exceed the corresponding maximum numbers, the UE may drop one or more of the search space sets, the space set to drop including a UE specific search space (USS) set on the scheduling SCell or a USS set on the PCell.

In some embodiments, the UE may determine a single maximum number of the PDCCH candidates and a single maximum number of the non-overlapped CCEs, the single maximum number of PDCCH candidates and the single maximum number of non-overlapped CCEs to be shared for PDCCH monitoring on the PCell and PDCCH monitoring on the scheduling SCell that schedules the transmission on PCell.

In these embodiments, the single maximum number of PDCCH candidates and the single maximum number of non-overlapped CCEs may be determined by generation node B (gNB). In these embodiments, the PDCCH candidates and CCEs may be used to schedule a transmission on a PCell. In other embodiments, the PDCCH candidates and CCEs may be used by common search space (i.e., which doesn't schedule a transmission).

In some embodiments, the UE may determine first maximum numbers of PDCCH candidates and non-overlapped CCEs for PDCCH monitoring on the PCell, and second maximum numbers of PDCCH candidates and non-overlapped CCEs for PDCCH monitoring on the scheduling SCell that schedule the transmission on PCell.

In some embodiments, one or more of the PDCCH candidates and the non-overlapped CCEs of the scheduling SCell may be borrowed to increase PDCCH detection capability of the PCell.

In some embodiments, the UE may encode the PDSCH transmission and/or the PUSCH transmission for the PCell based on the DCI format. In some embodiments, the DCI format is a DCI format 0_1 or DCI format 1_1 configured on the scheduling SCell.

In some embodiments, the UE may be configured to perform radio-link failure (RLF) monitoring on the PCell and refrain from performing RLF monitoring on the SCell.

In some other embodiments, the UE may perform radio-link failure (RLF) monitoring on the SCell and refrain from performing RLF monitoring on the PCell.

In some embodiments, when dynamic spectrum sharing (DSS) is deployed in which the PCell shares a same frequency spectrum as a long-term evolution (LTE) cell, the number of PDCCH candidates and the number of non-overlapped CCEs include PDCCH candidates and non-overlapped CCEs on the scheduling SCell. In these embodiments, when DSS is not deployed, the number of PDCCH candidates and the number of non-overlapped CCEs do not include PDCCH candidates and non-overlapped CCEs on the scheduling SCell. In these embodiments, when DSS is not deployed, the number of PDCCH candidates and the number of non-overlapped CCEs include only PDCCH candidates and non-overlapped CCEs on the PCell (i.e., an SCell is not used to schedule a transmission on the PCell). In these embodiments, the transmission of a PDCCH on a scheduling SCell avoids the need for rate matching which may need to be performed if a NR PCell uses the same frequency as LTE in dynamic spectrum sharing (DSS) deployments.

Some embodiments are directed to a non-transitory computer-readable storage medium that stores instructions for execution by processing circuitry of a user equipment (UE) configured for operating in a fifth-generation (5G) new radio (NR) network.

Some embodiments are directed to a generation node B (gNB) configured for operating in a fifth-generation (5G) new radio (NR) network. In these embodiments, the gNB may encode one or more of a plurality of physical downlink control channel (PDCCH) candidates for transmission to a user equipment (UE) on a scheduling secondary cell (SCell) with a downlink control information (DCI) format. The DCI format may schedule a physical downlink shared channel (PDSCH) transmission and/or a physical uplink shared channel (PUSCH) transmission of a primary cell (PCell). In these embodiments, the plurality of PDCCH candidates may include a number of the PDCCH candidates within a number of non-overlapped control-channel elements (CCEs) for the PCell. In these embodiments, the number of PDCCH candidates and the number of non-overlapped CCEs include PDCCH candidates and non-overlapped CCEs on the scheduling SCell. In these embodiments, the gNB may encode the PDSCH and/or the PUSCH for the PCell for transmission to the UE in accordance with the DCI format. In these embodiments, the scheduling SCell is an SCell that schedules a transmission on the PCell, and a PDCCH candidate and/or CCE may occupy a time and/or a frequency resource of the scheduling SCell.

These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
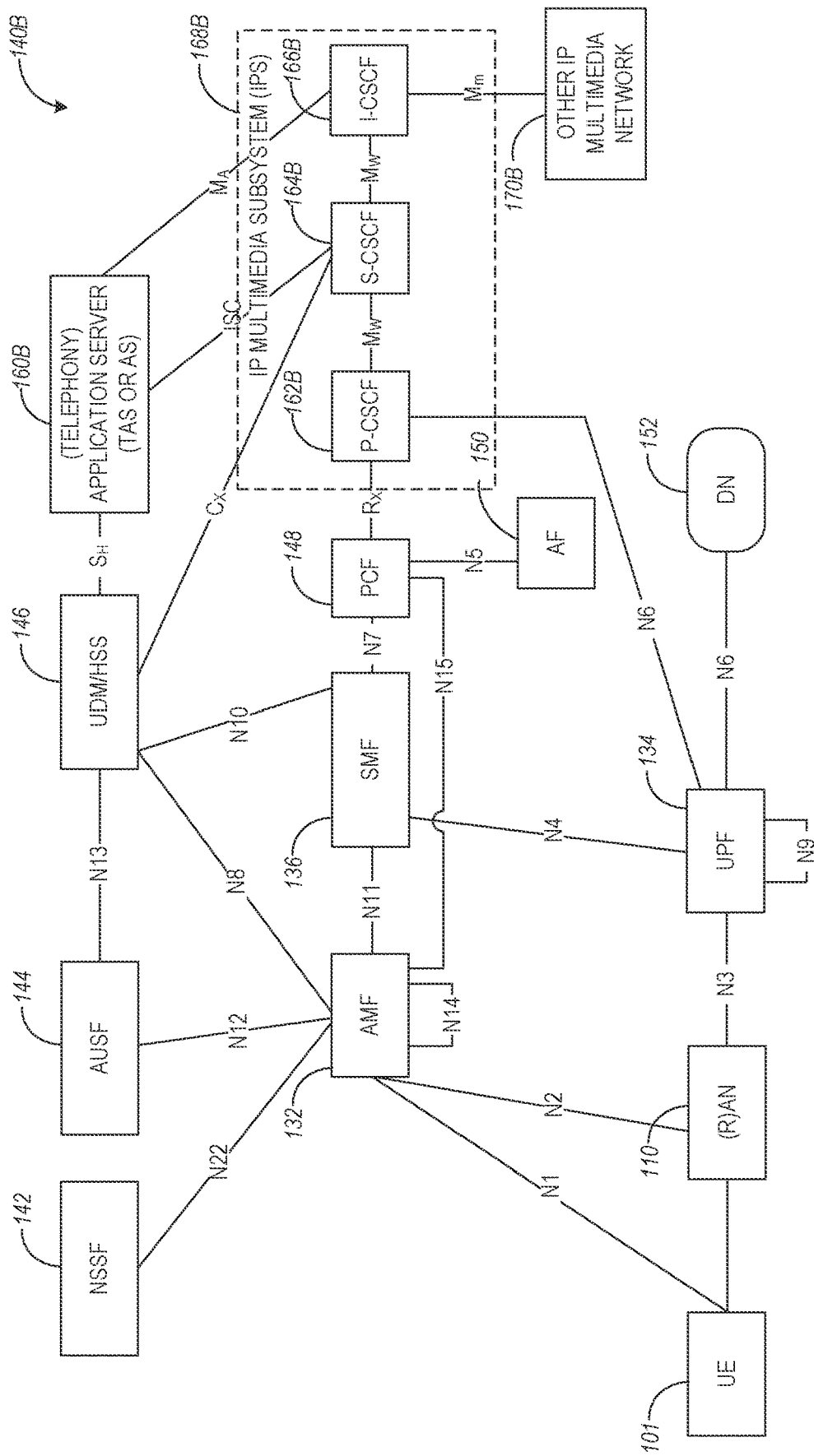
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
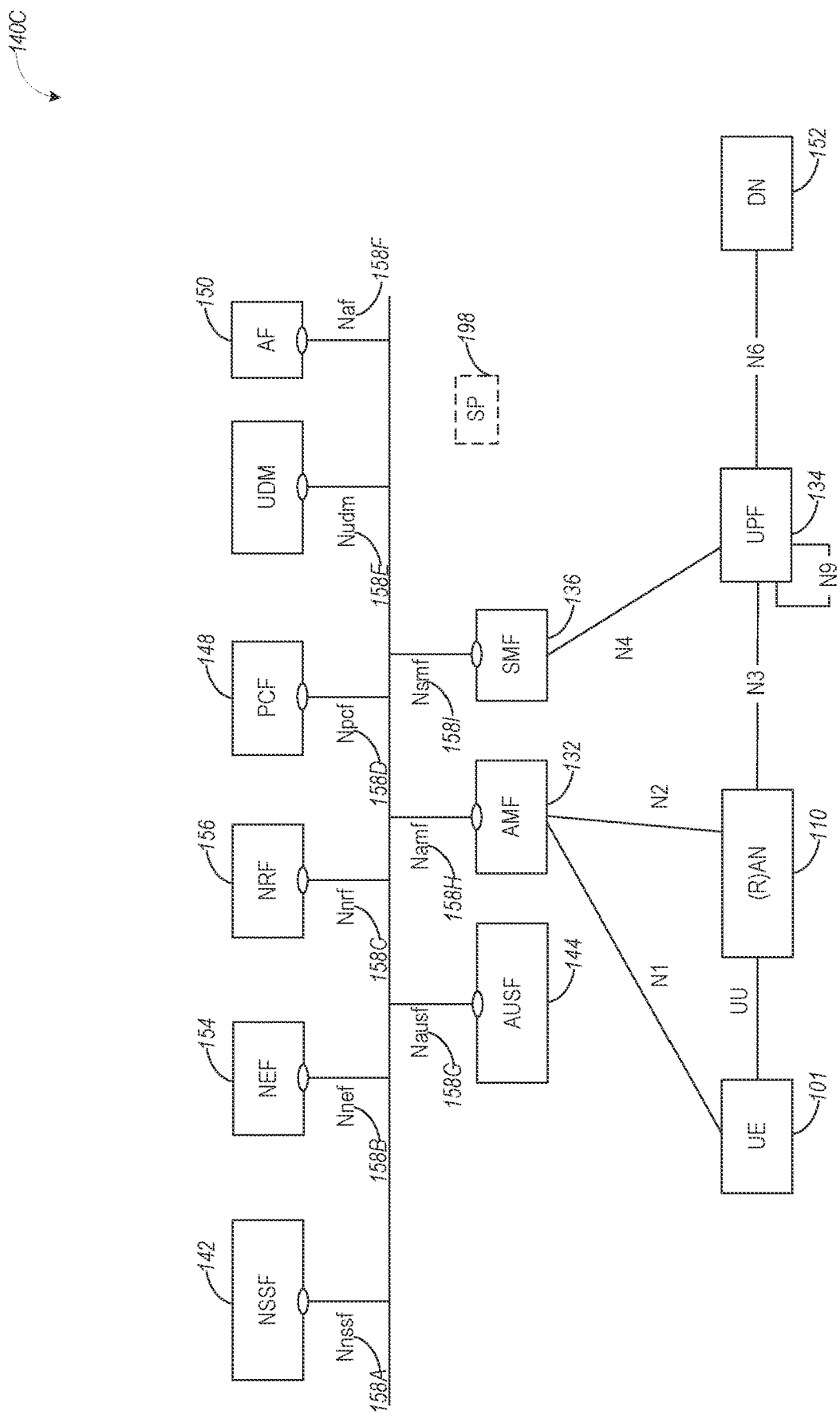

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the ANF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

In NR CA, the serving cells could be exactly synchronized at frame boundary. Alternatively, it is also possible that the frame boundaries of the serving cells are not aligned, however the offset between cells are in unit of one or multiple slots. According to NR slot structure, there is a slightly longer cyclic prefix (CP) inserted in every 0.5 ms. As a result, the slot boundaries of two serving cells may be only aligned in every 0.5 ms. The disclosed schemes in this disclosure can be used for either of or both of above two cases of synchronization.

PDCCH Monitoring Capability

In NR Rel-15 and Rel-16, all transmissions of a first cell are scheduled by PDCCHs in a single cell which is the first cell itself in self-scheduling or is a second cell in cross-carrier scheduling. For cross-carrier scheduling with different numerology, the limitation on the numbers of monitored PDCCH candidates and non-overlapped CCEs is derived by the numerology of the scheduling cell. Denote the maximum number of monitored PDCCH candidates as $M_{PDCCH}^{max,slot,\mu}$ for a DL BWP with SCS configuration $\mu$ for a UE per time unit for operation with a single serving cell. Denote the maximum number of non-overlapped CCEs as $C_{PDCCH}^{max,slot,\mu}$ for a DL BWP with SCS configuration $\mu$ that a UE is expected to monitor corresponding PDCCH candidates per time unit for operation with a single serving cell. The above time unit could be a slot or a span of PDCCH monitoring occasions.

Additionally, for carrier aggregation, another maximum number of monitored PDCCH candidates $M_{PDCCH}^{total,slot,\mu}$ and another maximum number of non-overlapped CCEs $C_{PDCCH}^{total,slot,\mu}$ are determined by the SCS configuration p and UE capability.

If a UE is configured with $N_{cells}^{DL,\mu}$ downlink cells with DL BWPs having SCS configuration $\mu$ where $\Sigma_{\mu=0}^{N_\mu} N_{cells}^{DL,\mu} \leq N_{cells}^{cap}$, the UE is not required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PDCCH}^{max,slot,\mu}$ non-overlapped CCEs per time unit for each scheduled cell. $N_{cells}^{cap}$ is a number of cells determined by UE capability.

If a UE is configured with $N_{cells}^{DL,\mu}$ downlink cells with DL BWPs having SCS configuration $\mu$, where $\Sigma_{\mu=0}^{N_\mu} N_{cells}^{DL,\mu} > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu}=\lfloor N_{cells}^{cap} \cdot M_{PDCCH}^{max,slot,\mu} \cdot N_{cells}^{DL,\mu}/\Sigma_{j=0}^{N_\mu} N_{cells}^{DL,j} \rfloor$ PDCCH candidates or more than $C_{PDCCH}^{total,slot,\mu}=\lfloor N_{cells}^{cap} \cdot C_{PDCCH}^{max,slot,\mu} \cdot N_{cells}^{DL,\mu}/\Sigma_{j=0}^{N_\mu} N_{cells}^{DL,j} \rfloor$ non-overlapped CCEs per time unit on the active DL BWP(s) of scheduling cell(s) from the $N_{cells}^{DL,\mu}$ downlink cells.

For each scheduled cell, the UE is not required to monitor on the active DL BWP with SCS configuration $\mu$ of the scheduling cell more than $M_{PDCCH}^{max,\mu}=\min(M_{PDCCH}^{max,slot,\mu}, M_{PDCCH}^{total,slot,\mu})$ PDCCH candidates or more than $C_{PDCCH}^{max,\mu}=\min(C_{PDCCH}^{max,slot,\mu}, C_{PDCCH}^{total,slot,\mu})$ non-overlapped CCEs per time unit.

If a transmission on PCell could be scheduled by a scheduling SCell, it is expected that a UE needs to detect PDCCH on both PCell and the scheduling SCell for the scheduling of a transmission on PCell. For example, a PDCCH in common search space set (CSS) is still configured on PCell, while a PDCCH in UE specific search space set (USS) is configured on the scheduling SCell. In another example, a PDCCH in CSS is still configured on PCell, some PDCCHs in USS are configured on PCell, while other PDCCHs in USS of PCell are configured the scheduling SCell. In another example, DCI format 0_0/1_0 is still configured on PCell, while DCI format 0_1/1_1 is configured on the scheduling SCell. In NR Rel-15 and Rel-15, PDCCH overbooking is supported and only supported for PCell. A PDCCH of CSS type3 may be configured on scheduling SCell too. Such PDCCHs of CSS type 3 could be considered as belonging to the scheduling SCell, so they do not occupy a PDCCH detection capability of PCell.

In some embodiments, if a transmission on PCell could be scheduled by a scheduling SCell, a single maximum number of monitored PDCCH candidates and a single maximum number of non-overlapped CCEs are determined and shared for the PDCCH monitoring on PCell and PDCCH monitoring on the scheduling SCell to schedule a transmission on PCell.

In one option, the maximum number of monitored PDCCH candidates and the maximum number of non-overlapped CCEs could be predefined or configured by RRC signaling.

In another option, the maximum number of monitored PDCCH candidates and the maximum number of non-overlapped CCEs could be $c_1 \cdot M_{PDCCH}^{max,slot,\mu}$ and $c_2 \cdot C_{PDCCH}^{max,slot,\mu}$ respectively, $c_1 \geq 1$, $c_2 \geq 1$. $c_1$ and $c_2$ could be predefined or configured by RRC signaling. $c_1$ and $c_2$ could be same or different. If the PCell and the scheduling SCell has the same SCS configuration $\mu$, $c_1=c_2=c$, it is treated as c serving cells with SCS configuration $\mu$ for the PDCCH monitoring on PCell and PDCCH monitoring on the scheduling SCell to schedule a transmission on PCell.

In some embodiments, if a transmission on PCell could be scheduled by a scheduling SCell, the maximum number of monitored PDCCH candidates and the maximum number of non-overlapped CCEs could be determined separately for the PDCCH monitoring on PCell and PDCCH monitoring on the scheduling SCell to schedule a transmission on PCell.

In one option, the maximum number of monitored PDCCH candidates and the maximum number of non-overlapped CCEs for the PDCCH monitoring on PCell and PDCCH monitoring on the scheduling SCell to schedule a transmission on PCell could be separately configured by high layer signaling. The sum of maximum number of monitored PDCCH candidates and the sum of maximum number of non-overlapped CCEs may be limited to $c_1 \cdot M_{PDCCH}^{max,slot,\mu}$ and $c_2 \cdot C_{PDCCH}^{max,slot,\mu}$ respectively, $c_1 \geq 1$, $c_2 \geq 1$. $c_1$ and $c_2$ could be predefined or configured by RRC signaling. $c_1$ and $c_2$ could be same or different. If the PCell and the scheduling SCell has the same SCS configuration $\mu$, $c_1=c_2=c$, it is treated as c serving cells with SCS configuration $\mu$ for the PDCCH monitoring on PCell and PDCCH monitoring on the scheduling SCell to schedule a transmission on PCell.

In another option, a pair of scaling factors p and s are predefined or configured by RRC signaling, $p \leq 1$, $s \leq 1$, which are used to determine the maximum number of monitored PDCCH candidates and the maximum number of non-overlapped CCEs for the PDCCH monitoring on PCell and PDCCH monitoring on the scheduling SCell to schedule a transmission on PCell respectively. For example, p+s=1.

To monitor a PDCCH that is configured on PCell, the UE is not required to monitor, on the active DL BWP of the PCell, more than $M_{PDCCH,p}^{max,slot,\mu}=f(p,M_{PDCCH}^{max,slot,\mu})$, e.g. $M_{PDCCH,p}^{max,slot,\mu}=\lfloor p \cdot M_{PDCCH}^{total,slot,\mu} \rfloor$ PDCCH candidates or more than $C_{PDCCH,p}^{max,slot,\mu}=g(p,C_{PDCCH}^{max,slot,\mu})$, e.g. $C_{PDCCH,p}^{max,slot,\mu}=\lfloor p \cdot C_{PDCCH}^{total,slot,\mu} \rfloor$ non-overlapped CCEs per time unit on PCell.

To monitor a PDCCH scheduling a data transmission on PCell that is configured on the scheduling SCell, the UE is not required to monitor, on the active DL BWP of the scheduling SCell, more than $M_{PDCCH,s}^{max,slot,\mu}=f(s,M_{PDCCH}^{max,slot,\mu})$, e.g. $M_{PDCCH,s}^{max,slot,\mu}=\lfloor s \cdot M_{PDCCH}^{total,slot,\mu} \rfloor$ PDCCH candidates or more than $C_{PDCCH,s}^{max,slot,\mu}=g(s,C_{PDCCH}^{max,slot,\mu})$, e.g. $M_{PDCCH,s}^{max,slot,\mu}=\lfloor s \cdot M_{PDCCH}^{total,slot,\mu} \rfloor$ non-overlapped CCEs per time unit of the scheduling SCell.

In this option, if the PCell and the scheduling SCell has the same SCS configuration $\mu$, it is treated as p+s serving cells with SCS configuration $\mu$ for the PDCCH monitoring on PCell and PDCCH monitoring on the scheduling SCell to schedule a transmission on PCell.

In some embodiments, if a transmission on PCell could be scheduled by a scheduling SCell, and if PCell and the scheduling SCell has different numerology $\mu_p$ and $\mu_s$ respectively, PDCCH monitoring capability for PCell should consider the impact of the different numerology of PCell and scheduling SCell.

In one option, the temporary numbers of monitored PDCCH candidates and non-overlapped CCEs are derived for each numerology. That is, $M_{PDCCH}^{max,\mu_p}$ and $C_{PDCCH}^{max,\mu_p}$, H are derived assuming PDCCH of PCell uses PCell numerology $\mu_p$. On the other hand, $M_{PDCCH}^{max,\mu_s}$ and $C_{PDCCH}^{max,\mu_s}$ are derived assuming PDCCH of PCell uses the scheduling SCell numerology $\mu_s$. Then, the maximum value between the above temporary numbers are used as the limitation on the numbers of monitored PDCCH candidates $M_{PDCCH}^{max}=\max(M_{PDCCH}^{max,\mu_p},M_{PDCCH}^{max,\mu_s})$ and non-overlapped CCEs $C_{PDCCH}^{max}=\max(C_{PDCCH}^{max,\mu_p},C_{PDCCH}^{max,\mu_s})$ for PCell. Alternatively, the minimum value between the above temporary numbers are used as the limitation on the numbers of monitored PDCCH candidates $M_{PDCCH}^{max}=\min(M_{PDCCH}^{max,\mu_p},M_{PDCCH}^{max,\mu_s})$ and non-overlapped CCEs $C_{PDCCH}^{max}=\min(C_{PDCCH}^{max,\mu_p},C_{PDCCH}^{max,\mu_s})$ for PCell.

In one option, the PCell is considered as a fractional number p of a cell with numerology $\mu_p$ and a fractional number s of a cell with numerology $\mu_s$, p≤1, s≤1. The sum of value p and s could equal to 1. The factional value p and s are used to determine the numerology related maximum numbers of monitored PDCCH candidates and non-overlapped CCEs $M_{PDCCH}^{total,slot,\mu}$ and $C_{PDCCH}^{total,slot,\mu}$ on PCell and the scheduling SCell respectively. The factional value p is also used to determine the maximum numbers of monitored PDCCH candidates and non-overlapped CCEs $M_{PDCCH}^{max,slot,\mu}$ and $C_{PDCCH}^{max,slot,\mu}$ that are applied to PDCCH detections on PCell. The factional value s is also used to determine the maximum numbers of monitored PDCCH candidates and non-overlapped CCEs $M_{PDCCH,s}^{total,slot,\mu_s}$ and $C_{PDCCH,s}^{total,slot,\mu_s}$ that are applied to PDCCH detections for PCell that are configured on the scheduling SCell. Further, the value pairs of p and s could be separately configured to determine the maximum numbers of monitored PDCCH candidates and non-overlapped CCEs. The value pair of p and s that is used to determine $M_{PDCCH}^{total,slot,\mu}$ and $C_{PDCCH}^{total,slot,\mu}$ could be separately configured from the value pair of p and s that is used to determine $M_{PDCCH,p}^{total,slot,\mu_p}$, $C_{PDCCH,p}^{total,slot,\mu_p}$, $M_{PDCCH,p}^{total,slot,\mu_s}$, and $C_{PDCCH,p}^{total,slot,\mu_s}$.

Assuming P SCells has same numerology $\mu_p$ as PCell, $N_{cells}^{DL,\mu_p}=P+p$. Assuming S SCells including the scheduling SCell has same numerology $\mu_s$ as the scheduling SCell, $N_{cells}^{DL,\mu_s}=S+s$.

If a UE is configured with $N_{cells}^{DL,\mu}$ downlink cells with DL BWPs having SCS configuration $\mu$ where $$\sum_{\mu=0}^{N_\mu} N_{cells}^{DL,\mu} \leq N_{cells}^{cap},$$

the UE is not required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PDCCH}^{max,slot,\mu}$ non-overlapped CCEs per time unit for each scheduled SCell.

For the PDCCH of PCell which are configured on PCell, the UE is not required to monitor, on the active DL BWP of the PCell, more than $M_{PDCCH}^{total,slot,\mu_p}=M_{PDCCH}^{max,slot,\mu_p}$ PDCCH candidates or more than $C_{PDCCH}^{total,slot,\mu_p}=C_{PDCCH}^{total,slot,\mu_s}$ non-overlapped CCEs per time unit on PCell.

For the PDCCH of PCell which are configured on the scheduling SCell, the UE is not required to monitor, on the active DL BWP of the scheduling SCell, more than $M_{PDCCH}^{total,slot,\mu_s}=M_{PDCCH}^{max,slot,\mu_s}$ PDCCH candidates or more than $C_{PDCCH}^{total,slot,\mu_s}=C_{PDCCH}^{max,slot,\mu_s}$ non-overlapped CCEs per time unit of the scheduling SCell.

If a UE is configured with $N_{cells}^{DL,\mu}$ downlink cells with DL BWPs having SCS configuration $\mu$, where $\sum_{\mu=0}^{N_\mu} N_{cells}^{DL,\mu} > N_{cells}^{cap}$, the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} / \sum_{j=0}^{N_\mu} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} / \sum_{j=0}^{N_\mu} N_{cells}^{DL,j} \right\rfloor$$

non-overlapped CCEs per time unit on the active DL BWP(s) of scheduling cell(s) from a SCell of the $N_{cells}^{DL,\mu}$ downlink cells.

For the PDCCH of PCell which are configured on PCell, the UE is not required to monitor, on the active DL BWP of the PCell, more than $M_{PDCCH}^{total,slot,\mu_p}$ PDCCH candidates or more than $C_{PDCCH}^{total,slot,\mu_p}$ non-overlapped CCEs per time unit on PCell.

For the PDCCH of PCell which are configured on the scheduling SCell, the UE is not required to monitor, on the active DL BWP of the scheduling SCell, more than $M_{PDCCH}^{total,slot,\mu_s}$ PDCCH candidates or more than $C_{PDCCH}^{total,slot,\mu_s}$ non-overlapped CCEs per time unit of the scheduling SCell.

For the PDCCH of PCell which are configured on PCell, the UE is not required to monitor, on the active DL BWP of the PCell, more than $M_{PDCCH,p}^{max,slot,\mu_p}=f(p,M_{PDCCH}^{max,slot,\mu_p})$, e.g.

$M_{PDCCH,p}^{max,slot,\mu_p} = \lfloor p \cdot M_{PDCCH}^{max,slot,\mu_p} \rfloor$ PDCCH candidates or more than $C_{PDCCH,p}^{max,slot,\mu_p} = f(p, C_{PDCCH}^{max,slot,\mu_p})$, e.g. $C_{PDCCH,p}^{max,slot,\mu_p} = \lfloor p \cdot C_{PDCCH}^{max,slot,\mu_p} \rfloor$ non-overlapped CCEs per time unit on PCell. For the PDCCH of PCell which are configured on the scheduling SCell, the UE is not required to monitor, on the active DL BWP of the scheduling SCell, more than $M_{PDCCH,s}^{max,slot,\mu_s} = f(s, M_{PDCCH}^{max,slot,\mu_s})$ e.g. $M_{PDCCH,s}^{max,slot,\mu_s} = \lfloor s \cdot M_{PDCCH}^{max,slot,\mu_s} \rfloor$ PDCCH candidates or more than $C_{PDCCH,s}^{max,slot,\mu_s} = f(s, C_{PDCCH}^{max,slot,\mu_s})$ e.g. $C_{PDCCH,s}^{max,slot,\mu_s} = \lfloor s \cdot C_{PDCCH}^{max,slot,\mu_s} \rfloor$ non-overlapped CCEs per time unit of the scheduling SCell.

In this option, for the PDCCH of PCell which are configured on PCell, the UE is not required to monitor, on the active DL BWP of the PCell, more than $M_{PDCCH,p}^{max,\mu_p} = \min(M_{PDCCH,p}^{max,slot,\mu_p}, M_{PDCCH}^{total,slot,\mu_p})$ PDCCH candidates or more than $C_{PDCCH,p}^{max,\mu_p} = \min(C_{PDCCH,p}^{max,slot,\mu_p}, C_{PDCCH}^{total,slot,\mu_p})$ non-overlapped CCEs per time unit. On the other hand, for the PDCCH of PCell which are configured on the scheduling SCell, the UE is not required to monitor, on the active DL BWP of the scheduling SCell, more than $M_{PDCCH,s}^{max,\mu_s} = \min(M_{PDCCH,s}^{max,slot,\mu_s}, M_{PDCCH}^{total,slot,\mu_s})$ PDCCH candidates or more than $C_{PDCCH,s}^{max,\mu_s} = \min(C_{PDCCH,s}^{max,slot,\mu_s}, C_{PDCCH}^{total,slot,\mu_s})$ non-overlapped CCEs per time unit of the scheduling SCell. Alternatively, the total number of PDCCH candidates for PCell configured on PCell and the scheduling SCell should not exceed the $M_{PDCCH,p}^{max,\mu_p} = M_{PDCCH,p}^{max,\mu_s}$. On the other hand, the total number of non-overlapped monitored CCEs for PCell configured on PCell and the scheduling SCell should not exceed $C_{PDCCH,p}^{max,\mu_p} = C_{PDCCH,p}^{max,\mu_s}$.

In some embodiments, if a transmission on PCell could be scheduled by a scheduling SCell, and if multiple-TRP (M-TRP) could be configured for the PDSCH transmission on PCell, the maximum number of monitored PDCCH candidates and the maximum number of non-overlapped CCEs for the PDCCH monitoring on PCell and PDCCH monitoring on the scheduling SCell to schedule a transmission on PCell are impacted by M-TRP operation.

In one option, the maximum number of monitored PDCCH candidates and the maximum number of non-overlapped CCEs $M_{PDCCH}^{max,slot,\mu}$ and $C_{PDCCH}^{max,slot,\mu}$ for a cell could be scaled by a scaling factory in M-TRP operation. That is, $\gamma \cdot M_{PDCCH}^{max,slot,\mu}$ and $\gamma \cdot C_{PDCCH}^{max,slot,\mu}$ could be used to replace $M_{PDCCH}^{max,slot,\mu}$ and $C_{PDCCH}^{max,slot,\mu}$ respectively in the above embodiments as the maximum number of monitored PDCCH candidates and the maximum number of non-overlapped CCEs for the PDCCH monitoring. γ could be defined as per multiple TRP operation in NR Rel-16.

For example, if a pair of scaling factors are used to determine the PDCCH monitoring on PCell and PDCCH monitoring on the scheduling SCell to schedule a transmission on PCell respectively, for a cell configured with monitoringCapabilityConfig-r16=x with a scaling factor s, $M_{PDCCH}^{max,slot,\mu}$ and $C_{PDCCH}^{max,slot,\mu}$ are determined according to the configuration of monitoringCapabilityConfig-r16=r, scaled by scaling factory γ, γ≥1 then further scaled by the scaling factor s to obtain the maximum numbers of monitored PDCCH candidates and non-overlapped CCEs that are applicable to the cell, e.g. $\lfloor s \cdot \gamma \cdot M_{PDCCH}^{max,slot,\mu} \rfloor$ and $s \cdot \gamma \cdot C_{PDCCH}^{max,slot,\mu}$.

In another option, a scaling factor γ, γ≥1 is only applied to the maximum number of monitored PDCCH candidates and the maximum number of non-overlapped CCEs for PDCCH monitoring on the scheduling SCell to schedule a transmission on PCell in M-TRP operation. Since a PDSCH transmission on PCell may be only scheduled or mainly scheduled by a PDCCH transmitted on the scheduling SCell, it could be enough to only apply the scaling factory to the scheduling SCell. In this option, if the PCell and the scheduling SCell has the same SCS configuration μ, a scaling factor γ and a pair of scaling factors p and s for the PDCCH monitoring on PCell and PDCCH monitoring on the scheduling SCell to schedule a transmission on PCell respectively, it is treated as p+s·γ serving cells with SCS configuration μ for the PDCCH monitoring on PCell and PDCCH monitoring on the scheduling SCell to schedule a transmission on PCell.

In some embodiments, if a transmission on PCell could be scheduled by a scheduling SCell, the PDCCH monitoring on PCell and PDCCH monitoring on the scheduling SCell to schedule a transmission on PCell needs to consider the per slot or per span PDCCH monitoring capability of UE. A UE may indicate the support of a combination of PDCCH monitoring capability per slot on some serving cells and PDCCH monitoring capability per span on some other serving cells, e.g. by monitoringCabilityConfig-r16=r15monitoringcapability and monitoringCapabilityConfig-r16=r16monitoringcapability are configured. For a cell that is not configured with monitoringCapabilityConfig-r16, it can be same as monitoringCapabilityConfg-r16=r15monitoringcapability, i.e. PDCCH monitoring capability per slot.

In one option, for PCell and the scheduling cell, it is not supported that one cell is not configured with monitoringCapabilityConfig-r16 or is configured with monitoringCapabilityConfig-r16=r15monitoringcapability, while the other cell is configured with monitoringCapabilityConfig-r16=r16monitoringcapability.

In one option, for PCell and the scheduling cell, it is allowed that one cell is not configured with monitoringCapabilityConfg-r16 or is configured with monitoringCapabilityConfig-r16=r15monitoringcapability, while the other cell is configured with monitoringCapabilityConfig-r16=r16monitoringcapability. In this case, the maximum number of monitored PDCCH candidates and the maximum number of non-overlapped CCEs for the PDCCH monitoring on PCell and PDCCH monitoring on the scheduling SCell to schedule a transmission on PCell are determined separately.

For example, a pair of scaling factors $s_1$, $s_2$ could be predefined or configured by RRC signaling, $s_1 \leq 1$, $s_2 \leq 1$, which are used to determine the PDCCH monitoring on PCell and PDCCH monitoring on the scheduling SCell to schedule a transmission on PCell respectively. For example, $s_1 + s_2 = 1$. For a cell configured with monitoringCapabilityConfig-r16=x, a scaling factors and with numerology μ, $M_{PDCCH}^{max,slot,\mu}$ and $C_{PDCCH}^{max,slot,\mu}$ are first determined according to the configuration of monitoringCapabilityConfg-r16=x, then scaled by the scaling factor s to obtain the maximum numbers of monitored PDCCH candidates and non-overlapped CCEs that are applicable to the cell, e.g. $\lfloor s \cdot_{PDCCH}^{max,slot,\mu} \rfloor$ and $\lfloor s \cdot C_{PDCCH}^{max,slot,\mu} \rfloor$. For a cell that is not configured with monitoringCapabilityConfig-r16, it can be same as monitoringCapabilityConfig-r16=r15monitoringcapability.

In some embodiments, PDCCH overbooking is only applied to PDCCH monitoring on PCell.

In one option, denote the maximum number of monitored PDCCH candidates and the maximum number of non-overlapped CCEs for the PDCCH monitoring on PCell as $M_{PDCCH,p}^{max,\mu}$ and $C_{PDCCH,p}^{max,\mu}$. If the number of monitored PDCCH candidates and the number of non-overlapped CCEs for the PDCCH monitoring on PCell are more than $M_{PDCCH,p}^{max,\mu}$ or $C_{PDCCH,p}^{max,\mu}$, UE may drop a search space set, e.g. USS or a PDCCH candidate that is configured on PCell. On the other hand, denote the maximum number of monitored PDCCH candidates and the maximum number of non-overlapped CCEs that are configured on the scheduling SCell to schedule a transmission on PCell as $M_{PDCCH,s}^{max,\mu}$ and $C_{PDCCH,s}^{max,\mu}$, gNB should guarantee that, the number of monitored PDCCH candidates and the number of non-overlapped CCEs that are configured on the scheduling SCell to schedule a transmission on PCell do not exceed $M_{PDCCH,s}^{max,\mu}$ and $C_{PDCCH,s}^{max,\mu}$.

In another option, denote the maximum number of monitored PDCCH candidates and the maximum number of non-overlapped CCEs for PCell as $M_{PDCCH}^{max,\mu}$ and $C_{PDCCH}^{max,\mu}$, which includes PDCCH monitoring on PCell and PDCCH monitoring on the scheduling SCell that schedules a transmission on PCell. If the number of monitored PDCCH candidates and the number of non-overlapped CCEs for PCell are more than $M_{PDCCH}^{max,\mu}$ or $C_{PDCCH}^{max,\mu}$, UE may drop a search space set, e.g. USS or a PDCCH candidate that is configured for PDCCH monitoring on PCell. On the other hand, gNB should guarantee that, the number of monitored PDCCH candidates and the number of non-overlapped CCEs for the PDCCH monitoring on the scheduling SCell that schedules a transmission on PCell do not exceed $M_{PDCCH}^{max,\mu}$ and $C_{PDCCH}^{max,\mu}$.

In some embodiments, PDCCH overbooking is only applied to PDCCH monitoring that is configured on the scheduling SCell to schedule a transmission on PCell.

In one option, denote the maximum number of monitored PDCCH candidates and the maximum number of non-overlapped CCEs that are configured on the scheduling SCell to schedule a transmission on PCell as $M_{PDCCH,s}^{max,\mu}$ and $C_{PDCCH,s}^{max,\mu}$. If the number of monitored PDCCH candidates and the number of non-overlapped CCEs that are configured on the scheduling SCell to schedule a transmission on PCell are more than $M_{PDCCH,s}^{max,\mu}$ or $C_{PDCCH,s}^{max,\mu}$, UE may drop a search space set, e.g. USS or a PDCCH candidate that is configured on the scheduling SCell to schedule a transmission on PCell. On the other hand, denote the maximum number of monitored PDCCH candidates and the maximum number of non-overlapped CCEs for the PDCCH monitoring on PCell as $M_{PDCCH,p}^{max,\mu}$ and $C_{PDCCH,p}^{max,\mu}$. gNB should guarantee that, the number of monitored PDCCH candidates and the number of non-overlapped CCEs for the PDCCH monitoring on PCell do not exceed $M_{PDCCH,s}^{max,\mu}$ and $C_{PDCCH,s}^{max,\mu}$.

In another option, denote the maximum number of monitored PDCCH candidates and the maximum number of non-overlapped CCEs for PCell as $M_{PDCCH}^{max,\mu}$ and $C_{PDCCH}^{max,\mu}$, which includes PDCCH monitoring on PCell and PDCCH monitoring on the scheduling SCell that schedules a transmission on PCell. If the number of monitored PDCCH candidates and the number of non-overlapped CCEs for PCell are more than $M_{PDCCH}^{max,\mu}$ and $C_{PDCCH}^{max,\mu}$, UE may drop a search space set, e.g. USS or a PDCCH candidate that is configured on the scheduling SCell to schedule a transmission on PCell. On the other hand, gNB should guarantee that, the number of monitored PDCCH candidates and the number of non-overlapped CCEs for the PDCCH monitoring on PCell do not exceed $M_{PDCCH}^{max,\mu}$ and $C_{PDCCH}^{max,\mu}$.

A USS that schedules a transmission on PCell is only configured on the scheduling SCell. That is, there is only CSS configured on the PCell. In this case, gNB should guarantee that the number of monitored PDCCH candidates and the number of non-overlapped CCEs of the CSS doesn't exceed the corresponding maximum numbers $M_{PDCCH}^{max,\mu}$ and $C_{PDCCH}^{max,\mu}$. PDCCH overbooking can be applied to the USS that is configured on the scheduling SCell to schedule a transmission on PCell, so that the number of monitored PDCCH candidates and the number of non-overlapped CCEs for PCell doesn't exceed the corresponding maximum numbers $M_{PDCCH}^{max,\mu}$ and $C_{PDCCH}^{max,\mu}$.

Alternatively, a USS that schedules a transmission on PCell can be configured on both PCell and/or the scheduling SCell. Correspondingly, there may exist CSS only, USS only, or both USS and CSS in a slot or span on the PCell. In this case, gNB should guarantee that the number of monitored PDCCH candidates and the number of non-overlapped CCEs of the CSS and/or USS in the slot or span on the PCell doesn't exceed the corresponding maximum numbers $M_{PDCCH}^{max,\mu}$ and $C_{PDCCH}^{max,\mu}$. PDCCH overbooking can be applied to the other USS that is configured on the scheduling SCell to schedule a transmission on PCell, so that the number of monitored PDCCH candidates and the number of non-overlapped CCEs for PCell doesn't exceed the corresponding maximum numbers $M_{PDCCH}^{max,\mu}$ and $C_{PDCCH}^{max,\mu}$.

In some embodiments, PDCCH overbooking needs to consider the PDCCHs of PCell which are configured on both PCell and scheduling SCell.

In one option, PDCCH overbooking is only applied to the PDCCH transmission of PCell. From a UE point of view, the total number of PDCCH candidates for PCell configured on PCell and the scheduling SCell should not exceed the $M_{PDCCH}^{max,\mu}$. Meanwhile, the total number of non-overlapped monitored CCEs for PCell configured on PCell and the scheduling SCell should not exceed $C_{PDCCH}^{max,\mu}$. Herein, since the PDCCH transmissions happen on two cells, it is impossible to share the channel estimation on the CCEs located in different cells. Consequently, $C_{PDCCH}^{max,\mu}$ may become a limiting factor for flexibility of PDCCH transmission for PCell. Therefore, $C_{PDCCH}^{max,\mu}$ may need to be increased if only one parameter between $C_{PDCCH}^{max,\mu}$ and $M_{PDCCH}^{max,\mu}$ could be increased.

In one option, PDCCH overbooking could be applied to the PDCCH transmission of both PCell and the scheduling SCell. The overbooking of PCell and the scheduling SCell could be done independently. From a UE point of view, the total number of PDCCH candidates of the scheduling SCell should not exceed $M_{PDCCH}^{max,\mu}$. Meanwhile, the total number of non-overlapped monitored CCEs of the scheduling SCell should not exceed $C_{PDCCH}^{max,\mu}$. On the other hand, from a UE point of view, the total number of PDCCH candidates for PCell configured on PCell and the scheduling SCell should not exceed $M_{PDCCH}^{max,\mu}$. Meanwhile, the total number of non-overlapped monitored CCEs for PCell configured on PCell and the scheduling SCell should not exceed $C_{PDCCH}^{max,\mu}$. Similar to the previous option, $C_{PDCCH}^{max,\mu}$ may become a limiting factor for flexibility of PDCCH transmission for PCell. Therefore, $C_{PDCCH}^{max,\mu}$ may need to be increased if only one parameter between $C_{PDCCH}^{max,\mu}$ and $M_{PDCCH}^{max,\mu}$ could be increased for PCell.

In one option, a part of the capability on the monitored PDCCH candidates and the non-overlapped monitored CCEs of the scheduling SCell could be borrowed to increase PDCCH detection capability of PCell. From UE point of view, there is only limited or even no PDCCH transmissions in CSS of the scheduling SCell, hence the UE capability on PDCCH detection of the scheduling SCell may be not fully used. On the other hand, both CSS and USS need to be monitored for PCell, hence UE capability for PDCCH detection of a cell may limit the scheduling flexibility on PCell of gNB. Based on the analysis, $M_{PDCCH}^{max,\mu}$ and $C_{PDCCH}^{max,\mu}$ for the scheduling SCell may be decreased to $M_{PDCCH,s}^{max,\mu}$ and $C_{PDCCH,s}^{max,\mu}$. For example, $M_{PDCCH,s}^{max,\mu}=M_s \cdot M_{PDCCH}^{max,\mu}$, $C_{PDCCH,s}^{max,\mu}=c_s \cdot C_{PDCCH}^{max,\mu}$, $m_s$ and $c_s$ are scaling factors that are less than 1. On the other hand, $M_{PDCCH}^{max,\mu}$ and $C_{PDCCH}^{max,\mu}$ for PCell can be increased to $M_{PDCCH,p}^{max,\mu}$ and $C_{PDCCH,p}^{max,\mu}$. For example, $M_{PDCCH,p}^{max,\mu}=m_p \cdot M_{PDCCH}^{max,\mu}$, $C_{PDCCH,p}^{max,\mu}=c_p \cdot C_{PDCCH}^{max,\mu}$, $m_p$ and $c_p$ are scaling factors that are larger than 1. The sum of maximum number of monitored PDCCH candidates and the sum of maximum number of non-overlapped CCEs of PCell and the scheduling SCell may keep unchanged, i.e., $m_s+m_p=2$ and $c_s+c_p=2$. PDCCH overbooking may be applied for both PCell and the scheduling SCell respectively. For PCell, overbooking is done with limitation of $M_{PDCCH,p}^{max,\mu}$ and $C_{PDCCH,p}^{max,\mu}$. For the scheduling SCell, overbooking is done with limitation of $M_{PDCCH,s}^{max,\mu}$ and $C_{PDCCH,s}^{max,\mu}$. Alternatively, PDCCH overbooking is still only allowed for PCell with limitation of $M_{PDCCH,p}^{max,\mu}$ and $C_{PDCCH,p}^{max,\mu}$. On the other hand, PDCCH overbooking is not allowed for the scheduling SCell, i.e. the configured number of PDCCH detection must not exceed $M_{PDCCH,s}^{max,\mu}$ or $C_{PDCCH,s}^{max,\mu}$.

Pattern of PDCCH Monitoring Span for PCell

If a transmission on PCell could be scheduled by a scheduling SCell, it is expected that a UE needs to detect PDCCH on both PCell and the scheduling SCell for the scheduling of a transmission on PCell. For example, a PDCCH in CSS is still configured on PCell, while a PDCCH in USS is configured on the scheduling SCell. In another example, a PDCCH in CSS is still configured on PCell, some PDCCHs in USS are configured on PCell, while other PDCCHs in USS of PCell are configured on the scheduling SCell. In another example, DCI format 0_0/1_0 is still configured on PCell, while DCI format 0_1/1_1 is configured on the scheduling SCell. A PDCCH of CSS type3 may be configured on scheduling SCell too. If per span-based capability on PDCCH monitoring is configured, the span pattern should be determined considering the PDCCHs of PCell which are configured on both PCell and the scheduling SCell.

In one option, the span pattern for PDCCH monitoring of PCell could be determined separately for the PDCCH transmission on PCell and the PDCCH transmission on the scheduling SCell. The restriction on span pattern applied in NR Rel-16 should be also satisfied on each of PCell and the scheduling SCell. For example, the maximum number of monitored PDCCH candidates and the maximum number of non-overlapped CCEs for the PDCCH monitoring on PCell and PDCCH monitoring on the scheduling SCell to schedule a transmission on PCell could be determined separately.

In one option, though the PDCCH transmissions for PCell are configured on PCell and the scheduling SCell separately, a span pattern should be determined considering all PDCCH monitoring for PCell which are configured on both PCell and the scheduling SCell. That is, a span includes all PDCCH monitoring occasions for PCell overlapped with span, no matter it is located on PCell or the scheduling SCell. For example, a single maximum number of monitored PDCCH candidates and a single maximum number of non-overlapped CCEs could be determined and shared for the PDCCH monitoring on PCell and PDCCH monitoring on the scheduling SCell to schedule a transmission on PCell.

In one option, if the PCell and the scheduling SCell has the same SCS configuration μ, a span pattern should be determined considering all PDCCH monitoring for PCell which are configured on both PCell and the scheduling SCell; otherwise, the span pattern for PDCCH monitoring of PCell could be determined separately for the PDCCH transmission on PCell and the PDCCH transmission on the scheduling SCell.

Priority Handling in PDCCH Overbooking

If a transmission on PCell could be scheduled by a scheduling SCell, it is expected that a UE needs to detect PDCCH on both PCell and the scheduling SCell for the scheduling of a transmission on PCell. For example, a PDCCH in CSS is still configured on PCell, some PDCCHs in USS are configured on PCell, while other PDCCHs in USS of PCell are configured the scheduling SCell. In another example, DCI format 0_0/1_0 is still configured on PCell, while DCI format 0_1/1_1 is configured on the scheduling SCell. A PDCCH of CSS type3 may be configured on scheduling SCell too. Such PDCCHs of CSS type 3 could be considered as belonging to the scheduling SCell, so they do not occupy a PDCCH detection capability of PCell. In NR Rel-15 and Rel-15, PDCCH overbooking is supported and only supported for PCell.

If the number of PDCCH detections of PCell in a time unit which are configured on PCell and the scheduling SCell is beyond the UE capability for a cell, certain priority is applied to determine the valid PDCCH monitoring, i.e. handling PDCCH overbooking. The numbers of monitored PDCCH candidates and non-overlapped CCEs are firstly allocated to CSS for PCell. Herein, CSS for PCell may be configured on PCell and/or the scheduling SCell. A UE does not expect to be configured CSS sets that result to corresponding total numbers of monitored PDCCH candidates and non-overlapped CCEs per time unit that exceed the corresponding maximum numbers per time unit of monitored PDCCH candidates and non-overlapped CCEs.

In one option, after the allocation for CSS of PCell, the remaining numbers of monitored PDCCH candidates and non-overlapped CCEs could be allocated to the PDCCHs in USS of PCell in an ascending order of search space set index, no matter a search space set is configured on PCell or the scheduling SCell. gNB could configure a prioritized search space set with smaller search space set index.

In one option, after the allocation for CSS of PCell, the remaining numbers of monitored PDCCH candidates and non-overlapped CCEs could be allocated to the PDCCHs in USS configured on PCell, i.e. the PDCCHs for PCell that use self-scheduling. Finally, the remaining numbers of monitored PDCCH candidates and non-overlapped CCEs could be allocated to the PDCCHs in USS of PCell that are configured on scheduling SCell, i.e. the PDCCHs for PCell that use cross-carrier scheduling.

In one option, after the allocation for CSS of PCell, the remaining numbers of monitored PDCCH candidates and non-overlapped CCEs could be allocated to the PDCCHs in USS of PCell that are configured on scheduling SCell, i.e. the PDCCHs for PCell use cross-carrier scheduling. Finally, the remaining numbers of monitored PDCCH candidates and non-overlapped CCEs could be allocated to the PDCCHs in USS configured on PCell, i.e. the PDCCHs for PCell use self-scheduling.

In the above three options, if all candidates in a search space set can't be mapped, any candidates in the search space set and in any subsequent SS sets are dropped.

Alternatively, if all candidates in a search space set can't be mapped, any candidates in the search space set are dropped. The UE could still check a subsequent search space set in ascending order of search space set index. That is, if all candidates in a subsequent search space set can be mapped, the candidates in the subsequent search space set could be monitored by UE. If multiple DCI formats are configured in a search space set of PCell, and if a first set of the DCI formats in the search space set use self-scheduling, while a second set of DCI formats in the search space set use cross-carrier scheduling, the above dropping rule could be separately applied to the candidates with the first set of DCI formats in the search space set and the candidates with the second set of DCI formats in the search space set. If all candidates with a first or second set of DCI formats in a search space set can't be mapped, any candidates with a first or second set of DCI formats in the search space set are dropped. In the above second option, the first set of DCI formats are checked before the second set of DCI formats. In the above third option, the second set of DCI formats are checked before the first set of DCI formats.

Dormancy Behavior Inside Active Time

NR supports dormancy behavior inside active time for a SCell for energy saving. The dormancy behavior is supported based on BWP framework. That is, at least two BWPs are configured on a SCell. One BWP is the dormant BWP which is configured without PDCCH monitoring or long cycle of PDCCH monitoring. Further, typically long cycle of CSI reporting is configured on the dormant BWP. The other BWP(s) is/are configured for normal data transmission, i.e. non-dormant BWP(s) for which normal PDCCH monitoring and normal CSI reporting are configured. If a transmission on PCell could be cross-carrier scheduled by a scheduling SCell, the dormancy behavior inside active time for a UE needs to be supported considering cross-carrier scheduling for PCell transmissions.

In some embodiments, dormancy behavior is not supported for both PCell and the scheduling SCell. The DCI format for dormancy switching, e.g. DCI format 1_1 could be configured on PCell and/or the scheduling SCell. The DCI format for dormancy switching could schedule a transmission on PCell or the scheduling SCell. If no data transmission is scheduled by the DCI format for dormancy switching, a bitmap is included in the DCI format which indicates the dormancy behavior of each SCell with a 1-by-1 mapping. It is not necessary to have a bit in the bitmap for the scheduling SCell. Alternatively, the bit corresponding to the scheduling SCell is still included in the bitmap but it could be neglected, or UE expect the bit for scheduling SCell is 1.

In some embodiments, dormancy behavior doesn't apply to PCell, but it could still apply to the scheduling SCell. The DCI format for dormancy switching, e.g. DCI format 1_1 could be configured on PCell and/or the scheduling SCell. The scheduling SCell could schedule a transmission on PCell at least in case the scheduling SCell is non-dormant.

In one option, when the scheduling SCell is dormant, a PDCCH scheduling a transmission on PCell could still be configured on the scheduling SCell. That is, the PDCCH scheduling a transmission on PCell is configured and configured on the dormant BWP of the scheduling SCell. Meanwhile, self-scheduling of PCell transmission may be configured too. In this case, both normal DCI format and fallback DCI format could be configured in a search space set for PCell which is configured on the dormant BWP of the scheduling Cell. Alternatively, only normal DCI format could be configured in a search space set for PCell which is configured on the dormant BWP of the scheduling Cell.

In one option, when the scheduling SCell is dormant, only the self-scheduling applies to a transmission on PCell. by this way, it maximizes the power saving due to minimizing UE reception on the scheduling SCell.

For a search space set of PCell for which self-scheduling is supported, the necessary fields in IE SearchSpace for self-scheduling should be configured, however, all optional fields except for nrofCandidates are neglected when cross-carrier scheduling from a scheduling SCell is used. Alternatively, two search space sets with same search space ID could be configured for PCell. One of the search space set is configured with the necessary fields in IE SearchSpace for self-scheduling. Regarding the other search space set, all optional fields except for nrofCandidates could be absent. Alternatively, the search space set configuration for PCell could be configured with the necessary fields in IE SearchSpace for self-scheduling and extended to include two fields for the number of PDCCH candidates per aggregation level, nrofCandidates_1 and nrofCandidates_2. nrofCandidates_1 is the number of PDCCH candidates per aggregation level when self-scheduling is used and nrofCandidates_2 is the number of PDCCH candidates per aggregation level when cross-carrier scheduling is used. Alternatively, at least two search space sets with same or different search space ID could be configured for PCell. At least one of the configured search space sets is for cross-carrier scheduling, and at least one of the configured search space sets is for self-scheduling.

In some embodiments, dormancy behavior could apply to PCell but it does not apply to the scheduling SCell. The DCI format for dormancy switching, e.g. DCI format 1_1 could be configured on PCell and/or the scheduling SCell. When PCell is dormant for a UE, the UE specific PDCCH scheduling PCell transmission for the UE is only configured sparsely or is not configured at all. However, UE may still need to monitor cell-common or group-common PDCCH on PCell. If no data transmission is scheduled by the DCI format for dormancy switching, a bitmap is included in the DCI format which indicates the dormancy behavior of PCell and the SCells except for the scheduling SCell with a 1-by-1 mapping. PCell could be grouped with some SCells to a group of cells. One bit in the DCI for dormancy switching is indicate the common dormancy behavior for the group of cells. Alternatively, one dedicated bit in the DCI for dormancy switching is used for the indication of dormancy behavior of PCell. On the other hand, other bit in the DCI for dormancy switching could be used to indicate dormancy behavior of a group of SCells.

Dormancy Behavior Outside Active Time

In DRX OFF period (outside active time) in NR Rel-15 and Rel-16, a UE only monitors PCell transmission. A gNB may transmit a wakeup signal of PDCCH (WUS PDCCH) outside active time to indicate DRX operation and dormancy behavior for the SCells in the coming DRX ON period (inside active time). WUS PDCCH is using a group common DCI. If a transmission on PCell could be cross-carrier scheduled by a scheduling SCell, the transmission of WUS PDCCH for a UE needs to be supported considering cross-carrier scheduling for PCell transmissions.

In one option, WUS PDCCH could be configured on the scheduling SCell for a UE. Since WUS PDCCH is group common, certain bit in the WUS DCI can be configured to indicate DRX behavior on PCell of the UE. Since the scheduling SCell of the UE could be the PCell for another UE. From gNB point of view, the same WUS PDCCH is configured on PCell of some UEs and is configured on the scheduling SCell of some other UEs.

In one option, in DRX OFF, the UE only monitors PDCCH configured on PCell, i.e. self-scheduling for PCell. Therefore, the UE could monitor WUS PDCCH on PCell. If it indicates the UE to be active in next DRX ON period, for a transmission on PCell in the DRX ON period, the UE could monitor a PDCCH configured on the scheduling SCell. Alternatively, the UE could monitor a PDCCH configured on PCell if the scheduling SCell is dormant as indicated by the WUS PDCCH. On the other hand, the UE could monitor a PDCCH configured on the scheduling SCell or both PCell and the scheduling SCell, if the scheduling SCell is non-dormant as indicated by the WUS PDCCH.

Fallback to Self-Scheduling on PCell

For the reliable operation of the CA system, when PDCCH on SCell scheduling a transmission on PCell is configured, i.e. cross-carrier scheduling, a fallback mechanism could be supported so that UE could switch back to the PDCCH monitoring on PCell for a transmission on PCell, i.e. self-scheduling.

In one option, for the transmission on default DL and/or UL BWP of PCell, self-scheduling could be used fixedly. Alternatively, both a search space set using self-scheduling and a search space set using cross-carrier scheduling could be configured on the default DL BWP on PCell. In this case, if a UE is provided a duration after which the UE falls back to the default BWP by bwp-InactivityTimer and if the BWP inactivity timer expires, the UE falls back to the default BWP so that self-scheduling applies for the transmission on PCell.

In one option, a dedicated timer controlling fallback to PCell scheduling is configured. The dedicated timer is started or restarted when there is a PDCCH on scheduling SCell which schedules a transmission on PCell. When the dedicated timer expires, UE could switch back to the PDCCH monitoring on PCell for a transmission on PCell. With this option, for a search space set of PCell for which self-scheduling is supported, the necessary fields in IE SearchSpace for self-scheduling should be configured, however, all optional fields except for nrofCandidates are neglected when cross-carrier scheduling from a scheduling SCell is used. Alternatively, two search space sets with same search space ID could be configured for PCell. One of the search space set is configured with the necessary fields in IE SearchSpace for self-scheduling. Regarding the other search space set, all optional fields except for nrofCandidates could be absent. Alternatively, the search space set configuration for PCell could be configured with the necessary fields in IE SearchSpace for self-scheduling and extended to include two fields for the number of PDCCH candidates per aggregation level, nrofCandidates_1 and nrofCandidates_2. nrofCandidates_1 is the number of PDCCH candidates per aggregation level when self-scheduling is used and nrofCandidates_2 is the number of PDCCH candidates per aggregation level when cross-carrier scheduling is used. Alternatively, at least two search space sets with same or different search space ID could be configured for PCell. At least one of the configured search space sets is for cross-carrier scheduling, and at least one of the configured search space sets is for self-scheduling.

RLF Handling

Procedure regarding Radio link failure (RLF) is designed to maintain a reliable link for transmission on PCell. If a transmission on PCell could be cross-carrier scheduled by a scheduling SCell, the related impact to RLF needs to be considered.

In one option, RLF monitoring is only proceeded for PCell. That is, the RS for RLF measurement is configured on PCell. A UE measure the RS and know the link quality of PCell. Then the UE may report the link quality to gNB. In case the PCell link is failed, UE could send a report to gNB to help gNB to do reconfiguration. If needed, the scheduling SCell could be configured as new PCell.

In one option, RLF monitoring is proceeded for the scheduling SCell instead of PCell. That is, the RS for RLF measurement is configured on the scheduling SCell. A UE measure the RS and know the link quality of the scheduling SCell. Then the UE may report the link quality to gNB. In case the link of the scheduling SCell is failed, UE could send a report to gNB to help gNB to do reconfiguration. Specifically, in case RLF happens for the scheduling SCell, gNB could reconfigure self-scheduling for PCell transmission or reconfigure a new scheduling SCell for cross-carrier scheduling for PCell.

In one option, RLF monitoring is proceeded for both PCell and the scheduling SCell. RLF procedure for the scheduling SCell and PCell could run independently. The RS for RLF are separately configure for PCell and scheduling SCell. The RLF related measurements and reports are also done separately for PCell and scheduling SCell. If RLF happens for PCell, gNB may need to reconfigure a new cell as PCell, the scheduling SCell could be configured as new PCell. If RLF happens on the scheduling SCell, gNB could reconfigure self-scheduling for PCell transmission or reconfigure a new scheduling SCell for cross-carrier scheduling.

Figure 2:
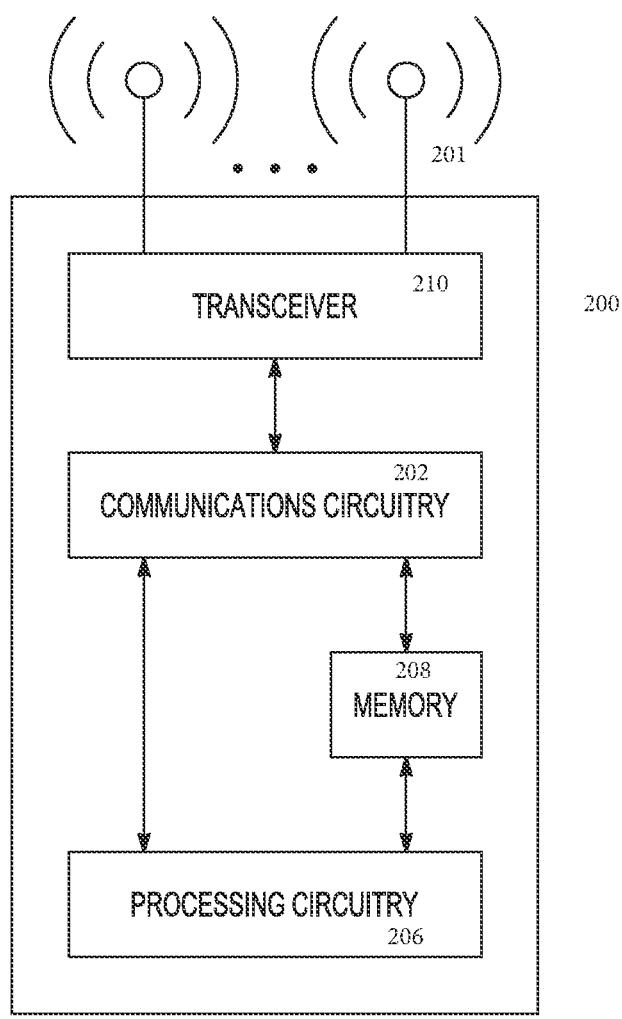
FIG. 2 illustrates a function block diagram of a wireless communication device in accordance with some embodiments.

In one embodiment, FIG. 2 illustrates a functional block diagram of a communication station that may be suitable for use as an UE or gNB. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

Some embodiments are directed to a method and system of wireless communication. In example 1, the UE receives the high layer configuration on the scheduling scheme for a transmission on PCell, UE detects a PDCCH scheduling a transmission on PCell which is on PCell or the scheduling SCell.

The method of example 1, PDCCH overbooking only applies to PCell, or applies to both PCell and the Scheduling SCell.

The method of example 2, the total number of PDCCH candidates for PCell configured on PCell and the scheduling SCell does not exceed the maximum number of monitored PDCCH candidates, the total number of non-overlapped monitored CCEs for PCell configured on PCell and the scheduling SCell should not exceed the maximum number of non-overlapped CCEs.

The method of example 3, at least the maximum number of non-overlapped CCEs is increased.

The method of example 2, a part of the capability on the monitored PDCCH candidates and the non-overlapped monitored CCEs of the scheduling SCell is borrowed to increase PDCCH detection capability of PCell.

The method of example 2, if a transmission on PCell could be scheduled by a scheduling SCell, and if PCell and the scheduling SCell has different numerology $\mu_p$ and $\mu_s$ respectively, the temporary numbers of monitored PDCCH candidates and non-overlapped CCEs are derived for each numerology, the maximum value between the above temporary numbers are used, or the minimum value between the above temporary numbers are used.

The method of example 2, if a transmission on PCell could be scheduled by a scheduling SCell, and if PCell and the scheduling SCell has different numerology $\mu_p$ and $\mu_s$ respectively, the PCell is considered as a fractional number of a cell with numerology $\mu_p$ and a fractional number of a cell with numerology $\mu_s$.

The method of example 1, if per span based capability on PDCCH monitoring is configured, the span pattern for PDCCH monitoring of PCell is determined separately for the PDCCH transmission on PCell and the PDCCH transmission on the scheduling SCell, or a span pattern is determined considering all PDCCH monitoring for PCell which are configured on both PCell and the scheduling SCell.

The method of example 1, to do PDCCH overbooking, the numbers of monitored PDCCH candidates and non-overlapped CCEs are first allocated to CSS of PCell, then USS configured on PCell, finally USS configured on the scheduling SCell.

The method of example 1, to do PDCCH overbooking, the numbers of monitored PDCCH candidates and non-overlapped CCEs are first allocated to CSS of PCell, then USS configured on the scheduling SCell, finally USS configured on PCell.

The method of example 1, dormancy behavior is not supported for both PCell and the scheduling SCell, or dormancy behavior doesn't apply to PCell, but it applies to the scheduling SCell, or dormancy behavior apply to PCell, but it does not apply to the scheduling SCell.

The method of example 11, when the scheduling SCell is dormant, a PDCCH scheduling a transmission on PCell is still configured on the scheduling SCell, or only the self-scheduling applies to a transmission on PCell.

The method of example 1, WUS PDCCH is configured on the scheduling SCell for a UE, or WUS PDCCH is configured on PCell for a UE.

The method of example 1, a dedicated timer is configured which controls the fallback to PCell scheduling.

The method of example 1, RLF monitoring is proceeded only for PCell, only for the scheduling SCell or for both PCell and the scheduling SCell.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operating in a fifth-generation (5G) new radio (NR) network, the apparatus comprising: processing circuitry; and memory, wherein the processing circuitry is configured to:
   decode radio resource control (RRC) signalling comprising a physical downlink control channel (PDCCH) configuration information element comprising a monitoring capability configuration (monitoringCapabilityConfig) that configures the UE for scheduling on a primary cell (PCell) from a scheduling secondary cell (SCell), the scheduling SCell being an SCell that schedules a transmission on the PCell;
   monitor search space sets for a number of PDCCH candidates within a number of non-overlapping control-channel elements (CCEs), wherein the number of PDCCH candidates and the number of non-overlapping CCEs include PDCCH candidates and non-overlapping CCEs on the scheduling SCell; and
   decode one or more of the PDCCH candidates on the scheduling SCell for a downlink control information (DCI) format, the DCI format scheduling one of a physical downlink shared channel (PDSCH) transmission and a physical uplink shared channel (PUSCH) transmission of the PCell,
   wherein the memory is configured to store the DCI format.

2. The apparatus of claim 1, wherein the search space set is a UE specific search space (USS) set, and
   wherein the DCI format is one of a DCI format 0_1 and a DCI format 1_1 configured on the scheduling SCell.

3. The apparatus of claim 2, wherein the monitoring capability configuration comprises a monitoringCapabilityConfig=r15monitoringcapability.

4. The apparatus of claim 3, wherein the processing circuitry is to determine a maximum number of the PDCCH candidates and a maximum number of the non-overlapping CCEs, and
   wherein the maximum number of PDCCH candidates and the maximum number of non-overlapping CCEs include PDCCH candidates and non-overlapping CCEs on the scheduling SCell and include PDCCH candidates and non-overlapping CCEs on the PCell.

5. The apparatus of claim 4, wherein when the number of the PDCCH candidates or the number of non-overlapping CCEs for monitoring the search space sets on both the PCell and the scheduling SCell exceed the corresponding maximum numbers, the processing circuitry is to configure the UE to refrain from monitoring one or more of the search space sets.

6. The apparatus of claim 5, wherein the one or more of the search space sets include at least one of a USS set on the scheduling SCell and a USS set on the PCell.

7. The apparatus of claim 6, wherein the maximum number of PDCCH candidates and the maximum number of non-overlapped CCEs are shared for search space set monitoring on the PCell and on the scheduling SCell.

8. The apparatus of claim 7, wherein when the number of the PDCCH candidates or the number of non-overlapping CCEs for monitoring the search space sets on both the PCell and the scheduling SCell exceed the corresponding maximum numbers, the processing circuitry is to configure the UE to drop one or more of the search space sets.

9. The apparatus of claim 6, wherein the processing circuitry is further configured to decode the scheduled PDSCH transmission and/or encode the scheduled PUSCH transmission for the PCell based on the DCI format.

10. The apparatus of claim 9, wherein the processing circuitry is configured to perform radio-link failure (RLF) monitoring on the PCell and refrain from performing RLF monitoring on the SCell.

11. A non-transitory computer-readable storage medium that stores instructions for execution by processing circuitry of a user equipment (UE) configured for operating in a fifth-generation (5G) new radio (NR) network, the processing circuitry is configured to:
    decode radio resource control (RRC) signalling comprising a physical downlink control channel (PDCCH) configuration information element comprising a monitoring capability configuration (monitoringCapabilityConfig) that configures the UE for scheduling on a primary cell (PCell) from a scheduling secondary cell (SCell), the scheduling SCell being an SCell that schedules a transmission on the PCell;
    monitor search space sets for a number of PDCCH candidates within a number of non-overlapping control-channel elements (CCEs), wherein the number of PDCCH candidates and the number of non-overlapping CCEs include PDCCH candidates and non-overlapping CCEs on the scheduling SCell; and
    decode one or more of the PDCCH candidates on the scheduling SCell for a downlink control information (DCI) format, the DCI format scheduling one of a physical downlink shared channel (PDSCH) transmission and a physical uplink shared channel (PUSCH) transmission of the PCell.

12. The non-transitory computer-readable storage medium of claim 11, wherein the search space set is a UE specific search space (USS) set, and
    wherein the DCI format is one of a DCI format 0_1 and a DCI format 1_1 configured on the scheduling SCell.

13. The non-transitory computer-readable storage medium of claim 12, wherein the monitoring capability configuration comprises a monitoringCapabilityConfig=r15monitoringcapability.

14. The non-transitory computer-readable storage medium of claim 13, wherein the processing circuitry is to determine a maximum number of the PDCCH candidates and a maximum number of the non-overlapping CCEs, and
    wherein the maximum number of PDCCH candidates and the maximum number of non-overlapping CCEs include PDCCH candidates and non-overlapping CCEs on the scheduling SCell and include PDCCH candidates and non-overlapping CCEs on the PCell.

15. The non-transitory computer-readable storage medium of claim 14, wherein when the number of the PDCCH candidates or the number of non-overlapping CCEs for monitoring the search space sets on both the PCell and the scheduling SCell exceed the corresponding maximum numbers, the processing circuitry is to configure the UE to refrain from monitoring one or more of the search space sets.

16. The non-transitory computer-readable storage medium of claim 15, wherein the one or more of the search space sets include at least one of a USS set on the scheduling SCell and a USS set on the PCell.

17. The non-transitory computer-readable storage medium of claim 16, wherein the maximum number of PDCCH candidates and the maximum number of non-overlapped CCEs are shared for search space set monitoring on the PCell and on the scheduling SCell.

18. The non-transitory computer-readable storage medium of claim 17, wherein when the number of the PDCCH candidates or the number of non-overlapping CCEs for monitoring the search space sets on both the PCell and the scheduling SCell exceed the corresponding maximum numbers, the processing circuitry is to configure the UE to drop one or more of the search space sets.

19. The non-transitory computer-readable storage medium of claim 16, wherein the processing circuitry is further configured to decode the scheduled PDSCH transmission and/or encode the scheduled PUSCH transmission for the PCell based on the DCI format.

20. The non-transitory computer-readable storage medium of claim 19, wherein the processing circuitry is configured to perform radio-link failure (RLF) monitoring on the PCell and refrain from performing RLF monitoring on the SCell.

* * * * *

UNITED STATES PATENT AND TRADEMARK OFFICE
CERTIFICATE OF CORRECTION

| | | |
|---|---|---|
| PATENT NO. | : 11,871,423 B2 | Page 1 of 1 |
| APPLICATION NO. | : 17/171729 | |
| DATED | : January 9, 2024 | |
| INVENTOR(S) | : Li et al. | |

It is certified that error appears in the above-identified patent and that said Letters Patent is hereby corrected as shown below:

On the Title Page

In "Related U.S. Application Data", in Column 1, Line 1-5, delete "Related U.S. Application Data (63) Continuation-in-part of application No. PCT/CN2020/121445, filed on Oct. 16, 2020, and a continuation of application No. PCT/CN2020/075115, filed on Feb. 13, 2020." and insert --30) Foreign Application Priority Data
Feb. 13, 2020 (CN) ........................ PCT/CN2020/075115
Oct. 16, 2020 (CN) ........................ PCT/CN2020/121445-- therefor.

Signed and Sealed this
Twenty-first Day of May, 2024

Katherine Kelly Vidal
*Director of the United States Patent and Trademark Office*